(12) United States Patent
Evans et al.

(10) Patent No.: US 11,505,303 B2
(45) Date of Patent: Nov. 22, 2022

(54) MODULAR ATTACHMENT FOR LEADING AND TRAILING EDGE STRUCTURES

(71) Applicant: AIRBUS OPERATIONS LIMITED, Bristol (GB)

(72) Inventors: Rodney Evans, Bristol (GB); Vernon Holmes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 304 days.

(21) Appl. No.: 16/580,062

(22) Filed: Sep. 24, 2019

(65) Prior Publication Data

US 2020/0115031 A1 Apr. 16, 2020

(30) Foreign Application Priority Data

Oct. 16, 2018 (GB) ...................................... 1816826

(51) Int. Cl.
*B64C 3/28* (2006.01)
*B64C 3/18* (2006.01)
*B64C 3/26* (2006.01)

(52) U.S. Cl.
CPC .............. *B64C 3/28* (2013.01); *B64C 3/185* (2013.01); *B64C 3/187* (2013.01); *B64C 3/26* (2013.01); *B64C 2211/00* (2013.01)

(58) Field of Classification Search
CPC ........... B64C 3/28; B64C 3/185; B64C 3/187; B64C 3/26; B64C 2211/00; B64C 3/18; B64C 1/26; B64C 9/02; F16B 5/025
See application file for complete search history.

(56) References Cited

U.S. PATENT DOCUMENTS

| | | | | |
|---|---|---|---|---|
| 3,747,168 A | * | 7/1973 | Snarskis ................ | F16B 5/025 411/349 |
| 5,411,266 A | * | 5/1995 | Guthry ............... | A63B 24/0003 473/218 |
| 5,927,665 A | * | 7/1999 | Grabnic ................ | E02F 3/3604 248/200 |

(Continued)

FOREIGN PATENT DOCUMENTS

| | | | | |
|---|---|---|---|---|
| CA | 2940485 C | * | 5/2019 | ................ F16B 5/01 |
| CN | 207045699 | | 2/2018 | |

(Continued)

OTHER PUBLICATIONS

European Search Report cited in EP 19203309.0 dated Mar. 3, 2020, 7 pages.

*Primary Examiner* — Assres H Woldemaryam
(74) *Attorney, Agent, or Firm* — Nixon & Vanderhye P.C.

(57) ABSTRACT

An adjustable fixed structure attachment system 200 for an aircraft wing, the attachment system 200 including a bracket 210 having: a wall 212 for connection to a wing box, a protrusion 214 protruding from the wall 212, and a slot 216 extending through the protrusion 214, wherein the slot 216 has a height and a width, and a bush 220 having a bore 222 extending therethrough for receipt of a pin, wherein the bush 222 is insertable into the slot 216 and dimensioned relative to the slot 216 so that the bush 220 is substantially immovable in a width-wise direction of the slot 216, and is moveable in a height-wise direction of the slot 216 to thereby vary a position of the bush 220 within the slot 216.

14 Claims, 6 Drawing Sheets

(56) References Cited

U.S. PATENT DOCUMENTS

| | | | |
|---|---|---|---|
| 6,966,722 B1 * | 11/2005 | Borror | F16B 5/025 |
| | | | 403/3 |
| 2009/0051090 A1 * | 2/2009 | Barnes, Jr. | B23K 37/0533 |
| | | | 269/8 |
| 2018/0149186 A1 * | 5/2018 | Bogrash | F16B 5/025 |
| 2018/0155004 A1 | 6/2018 | Woolcock | |
| 2018/0170519 A1 | 6/2018 | Brakes et al. | |
| 2019/0257093 A1 * | 8/2019 | Polk, Jr. | F16B 41/002 |

FOREIGN PATENT DOCUMENTS

| | | | |
|---|---|---|---|
| EP | 3 421 355 | 1/2019 | |
| FR | 2 776 983 | 10/1999 | |
| FR | 3073436 A1 * | 5/2019 | F16B 19/02 |

\* cited by examiner

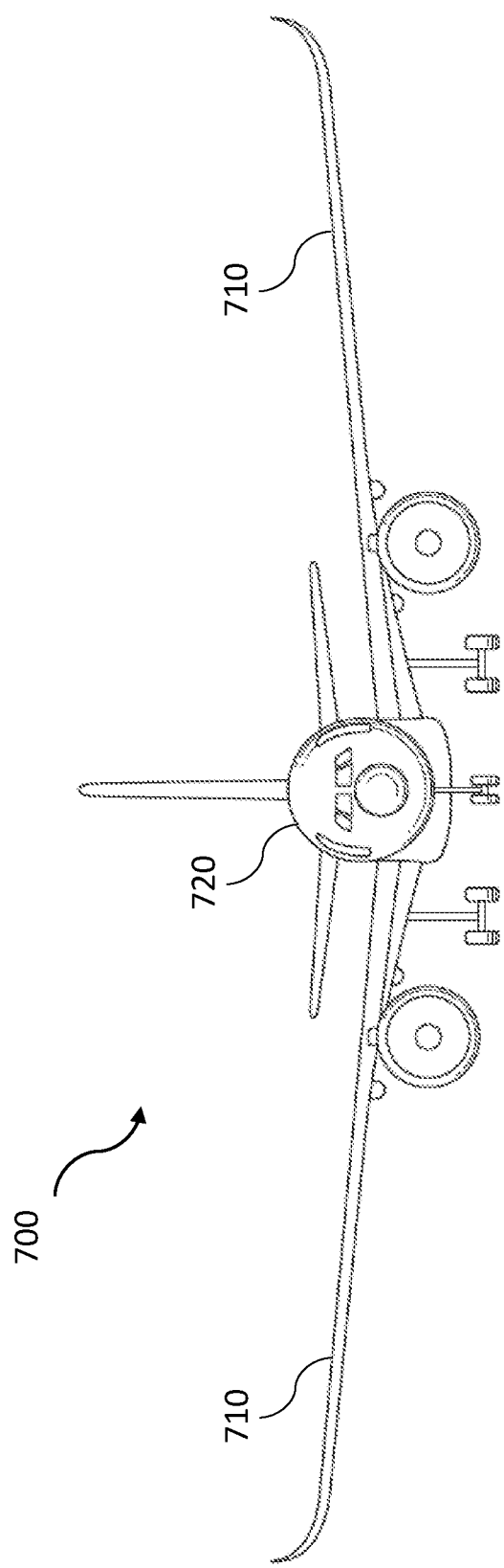

MODULAR ATTACHMENT FOR LEADING AND TRAILING EDGE STRUCTURES

RELATED APPLICATION

This application claims priority to United Kingdom Patent Application GB1816826.0 filed Oct. 16, 2018, the entire contents of which is incorporated by reference.

TECHNICAL FIELD

The present invention relates to adjustable fixed structure attachment systems for aircraft wings, fixed structure attachment arrangements for aircraft wings, modular aircraft wing portions, leading or trailing edge attachment systems for aircraft wings, and aircraft.

BACKGROUND

In some instances, individual aircraft components must be specifically modified to manage tolerance build up in aircraft assemblies and to ensure the aircraft meets aerodynamic requirements, leading to increased costs and delays in assembly. There is a general desire to increase the rate of manufacture and assembly of aircraft to meet commercial demands and to reduce costs.

SUMMARY

A first aspect of the present invention provides an adjustable fixed structure attachment system for an aircraft wing, the attachment system comprising a bracket, comprising: a wall for connection to a wing box, a protrusion protruding from the wall, and a slot extending through the protrusion, wherein the slot has a height and a width, and a bush having a bore extending therethrough for receipt of a pin, wherein the bush is insertable into the slot and dimensioned relative to the slot so that the bush is substantially immovable in a width-wise direction of the slot, and is moveable in a height-wise direction of the slot to thereby vary a position of the bush within the slot.

Optionally, an outer surface of the bush comprises parallel flattened areas on opposing sides of the bush, and a distance between the flattened areas is substantially equal to the width of the slot to prevent rotation of the bush relative to the bracket when the bush is in the slot.

Optionally, the bush comprises a flange extending radially outwardly from an outer surface of the bush, and the flange is configured to engage with the protrusion, when the bush is in the slot, to prevent the bush from passing through the slot.

Optionally, the attachment system comprises a retainer to hold the flange against the protrusion, the retainer configured to permit movement of the bush in the height-wise direction of the slot.

Optionally, the attachment system comprises a sleeve for insertion into the bore of the bush, the sleeve having a hole extending therethrough for receipt of a pin.

Optionally, when the sleeve is in the bore, the sleeve is rotatable relative to the bush.

Optionally, an axis of the hole is non-co-axial with an axis of the sleeve so that, when the sleeve is in the bore and the bush is in the slot, rotation of the sleeve relative to the bush changes the distance between the wall of the bracket and the axis of the hole.

Optionally, the attachment system comprises a pin configured to pass through the slot of the protrusion, the bore of the bush, the hole of the sleeve, where present, and a fixed structure connection of a leading or trailing edge fixed structure, and a pin retainer configured to engage with the pin to prevent movement of the pin along an axis of the pin when the pin is in the slot, the bore, the hole, where present, and the connection point of the leading or trailing edge fixed structure and the pin retainer is engaged with the pin.

Optionally, the bracket comprises a second protrusion protruding from the wall such that the protrusions are parallel and a gap between the protrusions is sufficient to receive a fixed structure connector of a leading or trailing edge fixed structure, and a second slot extending through the second protrusion and positioned so that the slots are co-axial, wherein the system comprises a second bush that is substantially identical to the bush and is insertable into the second slot.

Optionally, the attachment system comprises a second sleeve that is substantially identical to the sleeve and is insertable into the bore of the second bush.

Optionally, the pin is configured to pass through the second slot of the second protrusion, the bore of the second bush and the hole of the second sleeve, where present.

A second aspect of the present invention provides a fixed structure attachment arrangement for an aircraft wing, the arrangement comprising a bracket assembly, comprising: a bracket comprising a back wall configured to be fixedly attached to a datum surface of a wing box spar, and a protruding wall extending from the back wall and comprising a circular aperture and a bush having a bore extending therethrough for receipt of a pin, the bush being insertable into the aperture and having an outer diameter corresponding to the diameter of the aperture so that, when the bush is in the aperture, the bush is rotatable relative to the bracket, and an adjustable fixed structure attachment system according to the first aspect of the present invention, wherein, in use, the bracket assembly is configured to connect a first fixed structure connector of a leading or trailing edge fixed structure to the datum surface, and the adjustable fixed structure attachment system is configured to connect a second fixed structure connector of the leading or trailing edge fixed structure to the wing box.

Optionally, the bracket comprises a second protruding wall extending from the back wall such that the protruding walls are parallel and a gap between the protruding walls is sufficient to receive a first connection point of a leading or trailing edge fixed structure, the second wall comprising a second circular aperture having a diameter equal to the diameter of the circular aperture and positioned so that the circular apertures are co-axial, and a second bush that is substantially identical to the bush and is insertable into the second aperture.

A third aspect of the present invention provides a modular aircraft wing portion, comprising a wing box defining a datum surface, a leading or trailing edge fixed structure for connection to the datum surface, and a fixed structure attachment arrangement according to the second aspect of the present invention, wherein the leading or trailing edge fixed structure comprises a first fixed structure connector for connection to the datum surface by the bracket assembly and a second fixed structure connector for connection to the wing box by the adjustable fixed structure attachment system.

A fourth aspect of the present invention provides a leading or trailing edge attachment system for an aircraft wing, the system comprising a first bracket assembly for connection to a datum surface of a wing box of the aircraft wing, the first bracket assembly comprising a pivot for providing pivotal connection between a first connector of a leading or trailing edge and the datum surface and a second bracket assembly for connection to the wing box of the aircraft wing at a predetermined distance from the first bracket assembly, the second bracket assembly comprising a pivot for providing an adjustable pivotal connection between a second connector of the leading or trailing edge and the wing box, wherein the pivot point is configured to accommodate variation in the distance between the first and second connectors of the leading or trailing edge as compared to the predetermined distance.

A fifth aspect of the present invention provides an aircraft comprising one of more of: an adjustable fixed structure attachment system according to a first aspect of the present invention, a fixed structure attachment arrangement according to a second aspect of the present invention, a modular aircraft wing portion according to a third aspect of the present invention, and an aircraft leading or trailing edge attachment system according to a fourth aspect of the present invention.

BRIEF DESCRIPTION OF THE DRAWINGS

Embodiments of the invention will now be described, by way of example only, with reference to the accompanying drawings, in which:

FIG. 6 shows a schematic front view of an aircraft according to an embodiment of the invention.

DETAILED DESCRIPTION

There is a general desire to provide modular arrangements on aircraft, which can enable parts to be interchanged to allow the aircraft to be modified to optimise production and in-service costs and time. By way of example, an aircraft wing may comprise a standardised wing box, to which is attachable leading and/or trailing edges, selected from leading and/or trailing edges having different shapes or profiles. However, the advantages of a modular system can currently be limited by the need to modify some individual components to manage tolerance build-up.

Embodiments of the present invention provide systems that can manage tolerance build-up whilst maintaining positional accuracy between two connected parts.

Figure 1:
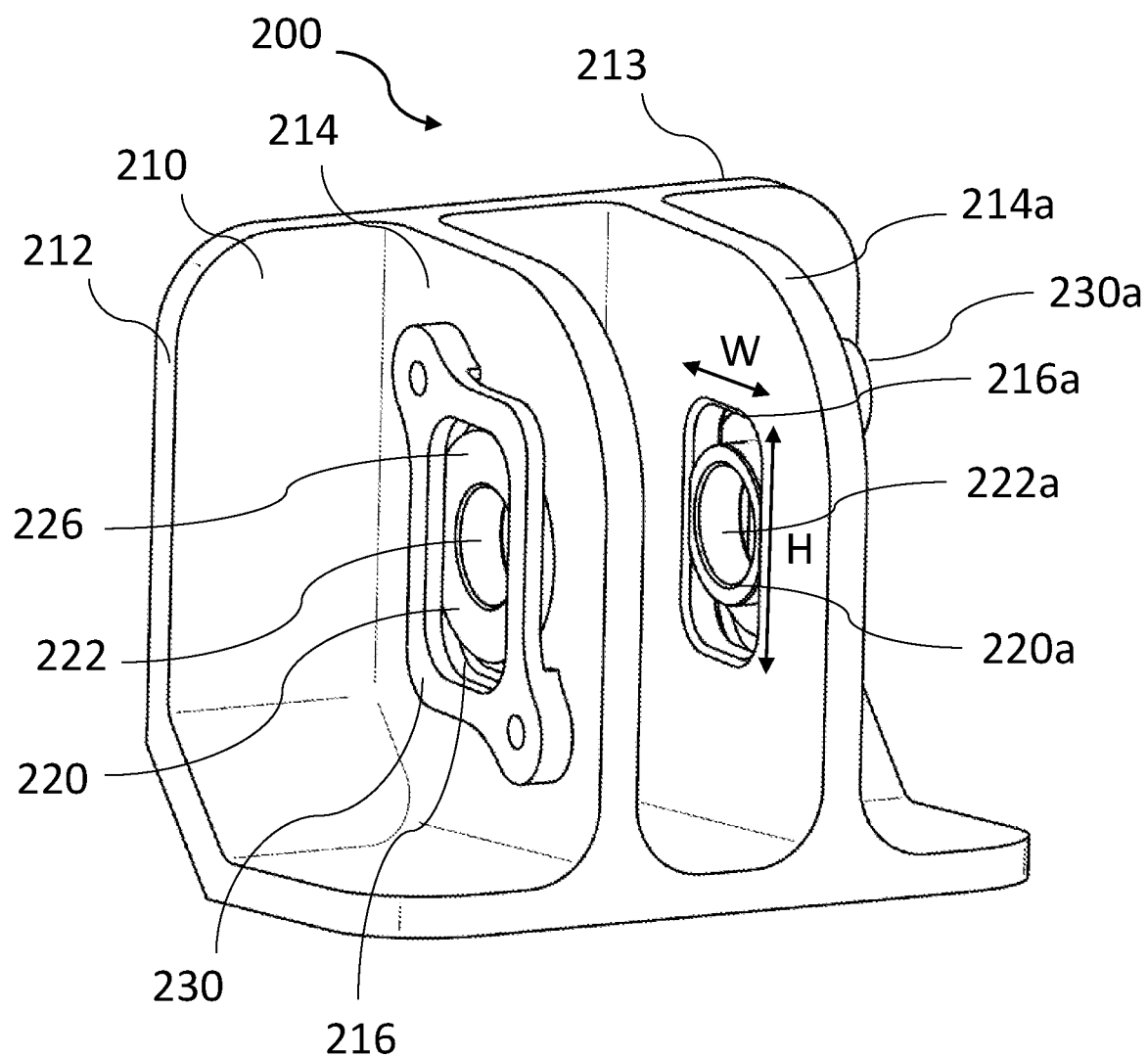
FIG. 1 shows a schematic isometric view of an adjustable fixed structure attachment system according to an embodiment of the invention.

FIG. 1 shows an isometric view of an adjustable fixed structure attachment system 200 according to an embodiment of the invention. In use, the system 200 may indirectly and adjustably connect a fixed structure, such as a leading or trailing edge, to a wing box spar. In the embodiment shown in FIG. 1, the system 200 is configured to indirectly and adjustably connect a rib comprised in a fixed structure to a wing box spar.

The system 200 comprises a bracket 210. The bracket 210 comprises a wall 212 for connection to a wing box spar. In this embodiment, the wall 212 comprises a substantially flat back surface 213 configured to interface with a corresponding surface of the wing box spar. In other embodiments, the back surface 213 may have a different shape, such as for corresponding to a shape of the wing box spar 400.

The bracket 210 comprises a protrusion 214 protruding from the wall 212. In this embodiment, the protrusion 214 is substantially perpendicular to the wall 212. In some embodiments, the protrusion 214 is integral with the wall 212. In other embodiments, the protrusion 214 is separate from and rigidly attached to the wall 212.

The bracket 210 comprises a slot 216 extending through the protrusion 214. The slot has a height H and a width W. In the embodiment shown in FIG. 1, the height H of the slot 216 is greater than the width W of the slot 216. In other embodiments, the Height H may be substantially equal to the width W, or the height H may be smaller than the width W.

The system 200 comprises a bush 220 having a bore 222 extending therethrough for receipt of a pin. The bush 220 is insertable into the slot 216 and dimensioned relative to the slot 216 so that the bush 220 is substantially immovable in a width-wise direction of the slot 216, and is moveable in a height-wise direction of the slot 216 to thereby vary a height-wise position of the bush 220 within the slot 216. In use, this helps to accommodate tolerance accumulation, as will become apparent below.

In some embodiments, an outer surface of the bush 220 comprises parallel flattened areas on opposing sides of the bush 220. The distance between the flattened areas is preferably substantially equal to the width W of the slot 216 to prevent rotation of the bush 220 relative to the bracket 210, whilst still allowing movement of the bush 220 in a height-wise direction of the slot 216 when the bush 220 is in the slot 216. In other embodiments, the flattened areas may be omitted.

In this embodiment, the bush comprises a flange 226 extending radially outwardly from the outer surface of the bush 220. The flange 226 is configured to engage with the protrusion 214 to prevent the bush 220 from passing through the slot 216. The flange 226 has a diameter that is greater than the width W of the slot so that the flange 226 extends beyond the edges of the slot 216 when the bush 220 is in the slot 216. In the embodiment shown in FIG. 1, the flange 226 has a circular outer cross-section. In other embodiments, the flange 226 may have an outer cross-section of a different shape. In some embodiments, the flange 226 may be omitted.

In this embodiment, the system 200 comprises a retainer 230 to hold the flange 226 against the protrusion 214. The retainer 230 is configured to prevent movement of the flange 226 away from the protrusion 214. The retainer 230 is configured to permit movement of the bush 220 in a height-wise direction of the slot 216. In some embodiments, the retainer 230 provides a stop for movement of the bush 220 in the height-wise direction of the slot 216. In some embodiments, the retainer 230 may be omitted.

In some embodiments, as shown in FIG. 1, the bracket 210 comprises a second protrusion 214a protruding from the wall 212 such that the protrusions 214, 214a are parallel and a gap between the protrusions 214, 214a is sufficient to receive a fixed structure connector (not shown). In use, the system 200 may indirectly connect a fixed structure to a wing box spar by retaining a fixed structure connector between the first protrusion 214 and the second protrusion 214a. The second protrusion 214a may be substantially identical to the protrusion 214, or may have a different shape compared to the protrusion 214. In embodiments wherein the bracket 210 comprises a second protrusion 214a, the bracket 210 comprises a second slot 216a extending through the second protrusion 214a and positioned so that the slots 216, 216a are co-axial. In some embodiments, as shown in FIG. 1, the system 200 comprises a second bush 220a that is substantially identical to the bush 220 and is insertable into the second slot 216a. In embodiments in which the bushes 220, 220a comprise a flange 226, the bushes 220, 220a are inserted into their respective slots 216, 216a such that the flanges 226 engage the outer sides of the protrusions 214, 214a, the outer sides being the sides of the protrusions 214, 214a that are most spaced apart from each other.

In the embodiment of FIG. 1, the system 200 comprises a second retainer 230a, configured as explained herein with respect to the retainer 230, the second retainer 230a to retain the second bush 220a in the second slot 216a. In other embodiments, the second retainer 230a may be omitted.

In some embodiments, the system 200 is provided as a kit of parts. In other embodiments, the system 200 is provided in assembled form, for example with the bush 220 retained in the slot 216 by the retainer 230.

Figure 2:
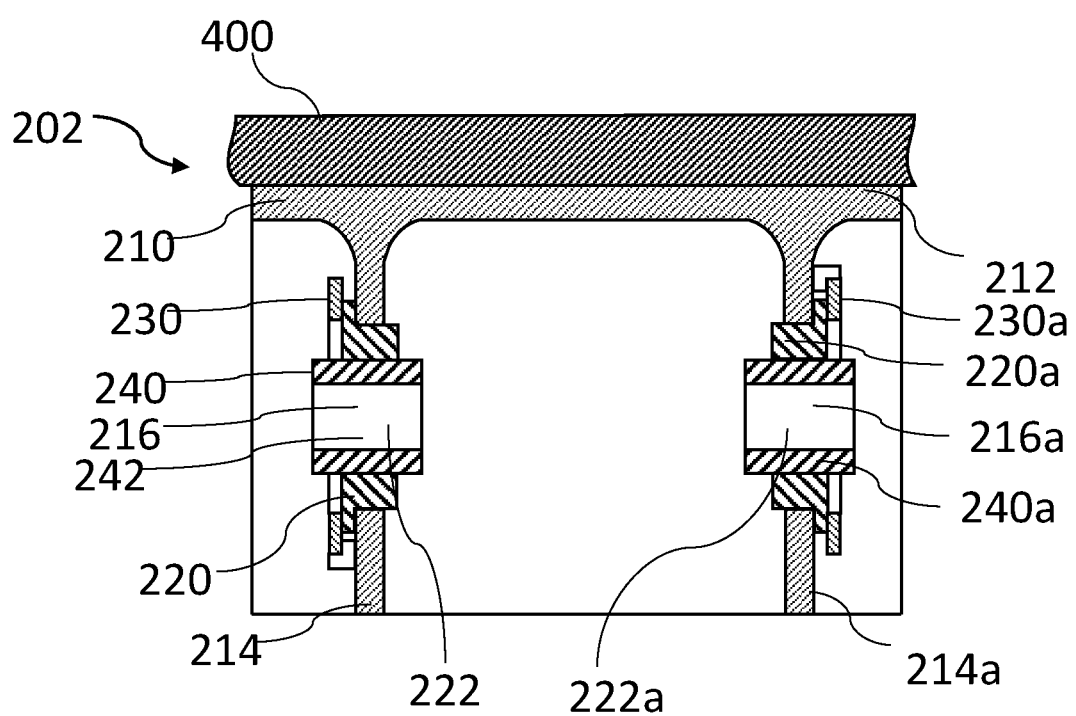
FIG. 2 shows a schematic cross-sectional view of an adjustable fixed structure attachment system according to an embodiment of the invention and a wing box spar.

FIG. 2 shows a schematic cross-sectional plan view of an adjustable fixed structure attachment system 202 according to an embodiment of the invention. The system 202 is similar to the system 200 described with reference to FIG. 1, but additionally comprises a sleeve 240. Like components have the same reference numbers and will not be described again in detail. In use, the system 202 may indirectly and adjustably connect a fixed structure, such as a leading or trailing edge, to a wing box spar 400.

The system 202 comprises a bracket 210, bush 220 and retainer 230 as described with reference to FIG. 1. In some embodiments of the system 202, the retainer 230 may be omitted. In the embodiment shown in FIG. 2, the bracket 210 comprises a second protrusion 214a, second slot 216a, second bush 220a and second retainer 230a. In use, the system 202 may indirectly connect a fixed structure to a wing box spar 400 by retaining a fixed structure connector (not shown) between the first protrusion 214 and the second protrusion 214a. In other embodiments, one or more of the second protrusion 214a, second slot 216a, second bush 220a and second retainer 230a may be omitted.

The system 202 comprises a sleeve 240 for insertion into the bore 222 of the bush 220. A second sleeve 240a is for insertion into the bore 222a. The sleeve 240 has a hole 242 extending therethrough. When the sleeve 240 is in the bore 222, the sleeve 240 is rotatable relative to the bush 220. In some embodiments, the diameter of the sleeve 240 is substantially equal to the diameter of the bore 222 to help prevent rattling of the sleeve 240 in the bush 220. In other embodiments, the sleeve 240 may be omitted.

In the embodiment shown in FIG. 2, an axis of the hole 242 is co-axial with an axis of the sleeve 240. In other embodiments, the axis of the hole 242 is non-co-axial with the axis of the sleeve 240 so that, when the sleeve 240 is in the bore 222 and the bush 220 is in the slot 216, rotation of the sleeve 240 relative to the bracket 210 changes a distance between the wall 212 and the axis of the hole 242. In such an embodiment, the axis of the hole 242 is movable in a width-wise and height-wise direction of the slot 216, to help accommodate tolerance accumulation, and the axis of the sleeve 240 is immovable in a width-wise and movable in a height-wise direction of the slot 216.

In some embodiments, the system 202 shown in FIG. 2 may comprise a pin (not shown) configured to pass through the slot 216, the bore 222 and a fixed structure connector (not shown). The fixed structure connector is comprised in a fixed structure to be connected to the wing box spar 400. In such embodiments, the system 202 comprises a pin retainer (not shown), such as a nut or collar, configured to engage with the pin to prevent movement of the pin along an axis of the pin when the pin is in the slot 216, bore 222 and fixed structure connector and the pin retainer is engaged with the pin. When the pin retainer is engaged with the pin, a tightening force along the direction of the axis prevents movement of the pin, sleeve 240 and the bush 220 in a height-wise direction of the slot 216 to hold the fixed structure connector 510 securely in position relative to the wing box spar 400.

In some embodiments, the system 202 is provided as a kit of parts. In other embodiments, the system 202 is provided in assembled form, for example with the bush 220 retained in the slot 216 by the retainer 230, and optionally with a pin and pin retainer retaining the bush 220, sleeve 240 in position relative to the bracket 210.

Figure 3:
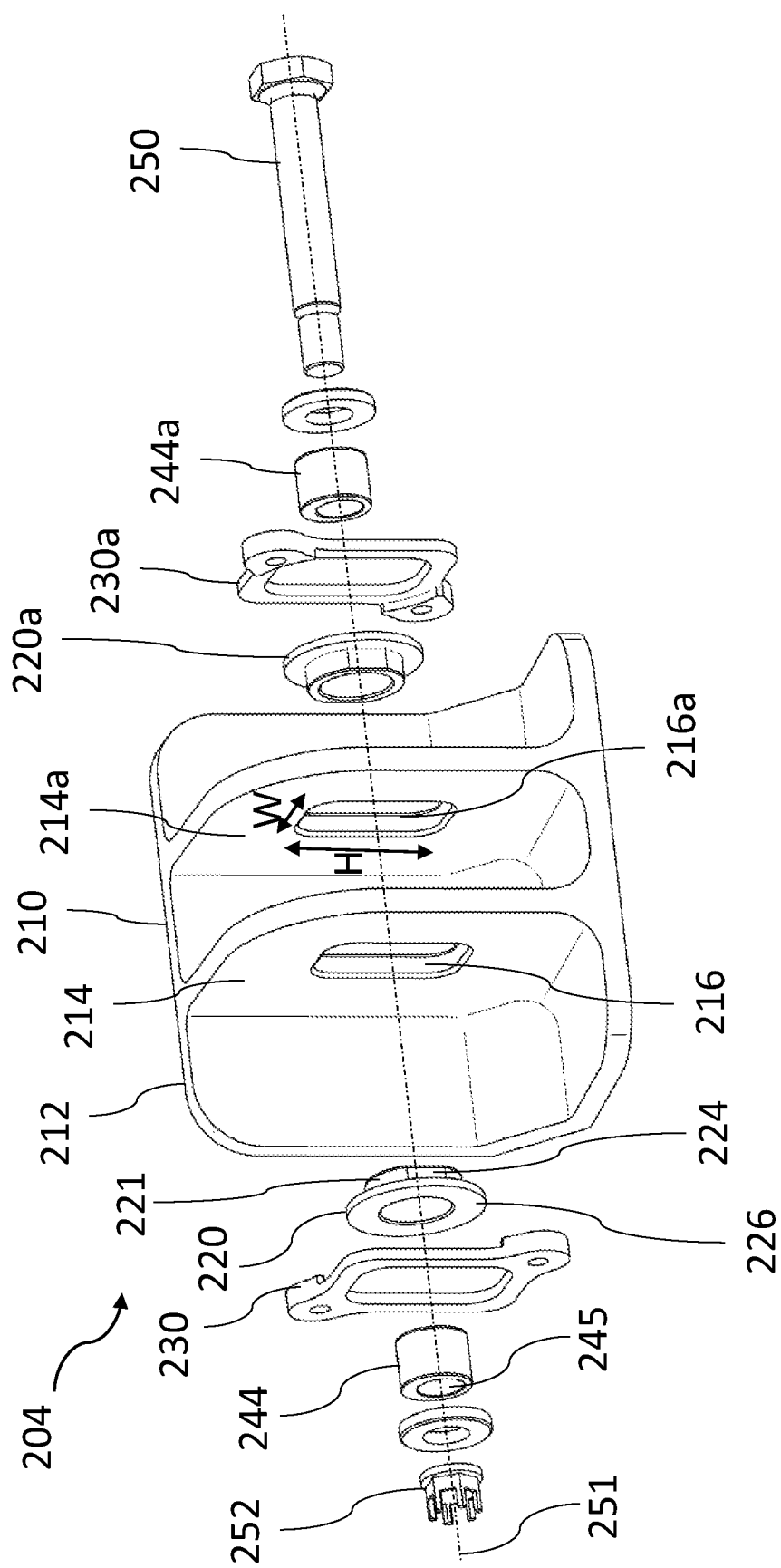
FIG. 3 shows a schematic isometric exploded view of an adjustable fixed structure attachment system according to an embodiment of the invention.

FIG. 3 shows a schematic isometric exploded view of an adjustable fixed structure attachment system 204 according to an embodiment of the invention. The system 204 is similar to the systems 200 and 202 described with reference to FIGS. 1 and 2 respectively. Like components have the same reference numbers and will not be described again in detail. In use, the system 204 may indirectly connect a fixed structure, such as a leading or trailing edge, to a wing box spar.

The system 204 comprises a bracket 210, bush 220 and retainer 230 as described with reference to FIG. 1. In some embodiments of the system 204, the retainer 230 may be omitted. In the embodiment shown in FIG. 3, the bracket 210 comprises a second protrusion 214a, second slot 216a, second bush 220a, second retainer 230a and second sleeve 240. In use, the system 204 may indirectly connect a fixed structure to a wing box spar by retaining a fixed structure connector between the first protrusion 216 and the second protrusion 216a. In other embodiments, one or more of the second protrusion 214a, second slot 216a, second bush 220a, second retainer 230a and second sleeve 240 may be omitted.

In the embodiment shown in FIG. 3, an outer surface 221 of the bush 220 comprises parallel flattened areas 224 on opposing sides of the bush 220. The distance between the flattened areas 224 is preferably substantially equal to the width W of the slot 216 to prevent rotation of the bush 220 relative to the bracket 210, whilst still allowing movement of the bush 220 in a height-wise direction of the slot 216 when the bush 220 is in the slot 216. In other embodiments, the flattened areas may be omitted.

The system 204 comprises a sleeve 244 having a hole 245 extending therethrough. In this embodiment, the axis of the hole 245 in the sleeve 244 is non-co-axial with an axis of the sleeve 244, so that, when the sleeve 244 is in the bore 222 and the bush 220 is in the slot 216, rotation of the sleeve 244 relative to the bracket 210 changes a distance between the wall 212 of the bracket 210 and the axis of the hole 245. In such an embodiment, the axis of the hole 245 is movable in a width-wise and height-wise direction of the slot 216, to help accommodate tolerance accumulation, and the axis of the sleeve 244 is immovable in a width-wise and movable in a height-wise direction of the slot 216.

The system 204 comprises a pin 250 and a pin retainer 252 as described with reference to FIG. 2 and configured to retain a fixed structure connector by providing a longitudinal force along the axis 251 of the pin when the pin retainer is engaged with the pin 250 is an assembled state of the system 204. In other embodiments, the pin 250 and pin retainer 252 may be supplied separately and thus omitted from the system 204.

In some embodiments, the system 204 is provided as a kit of parts. In other embodiments, the system 204 is provided in assembled form, for example with the bush 220 retained in the slot 216 by the retainer 230 and the pin 250 passing through the slots 216, 216a and retained by the pin retainer 252.

The systems 200, 202 and 204 as described with reference to FIGS. 1-3 help to manage tolerance build-up in a fixed structure, such as a leading or trailing edge, by permitting a limited range of movement of the bush 220 within the slot 216 in a height-wise direction of the slot 162. In some embodiments, tolerance build-up in more than one direction is managed by the provision of an eccentric hole 245 in the sleeve 244, which permits a change in the distance between the axis of the hole 245 and the wall 212 of the bracket 210 by rotation of the sleeve 244 relative to the bracket 210. Similar to bush 220 and sleeve 244, the second bush 220a are mounted to the second slot 216a.

Figure 4:
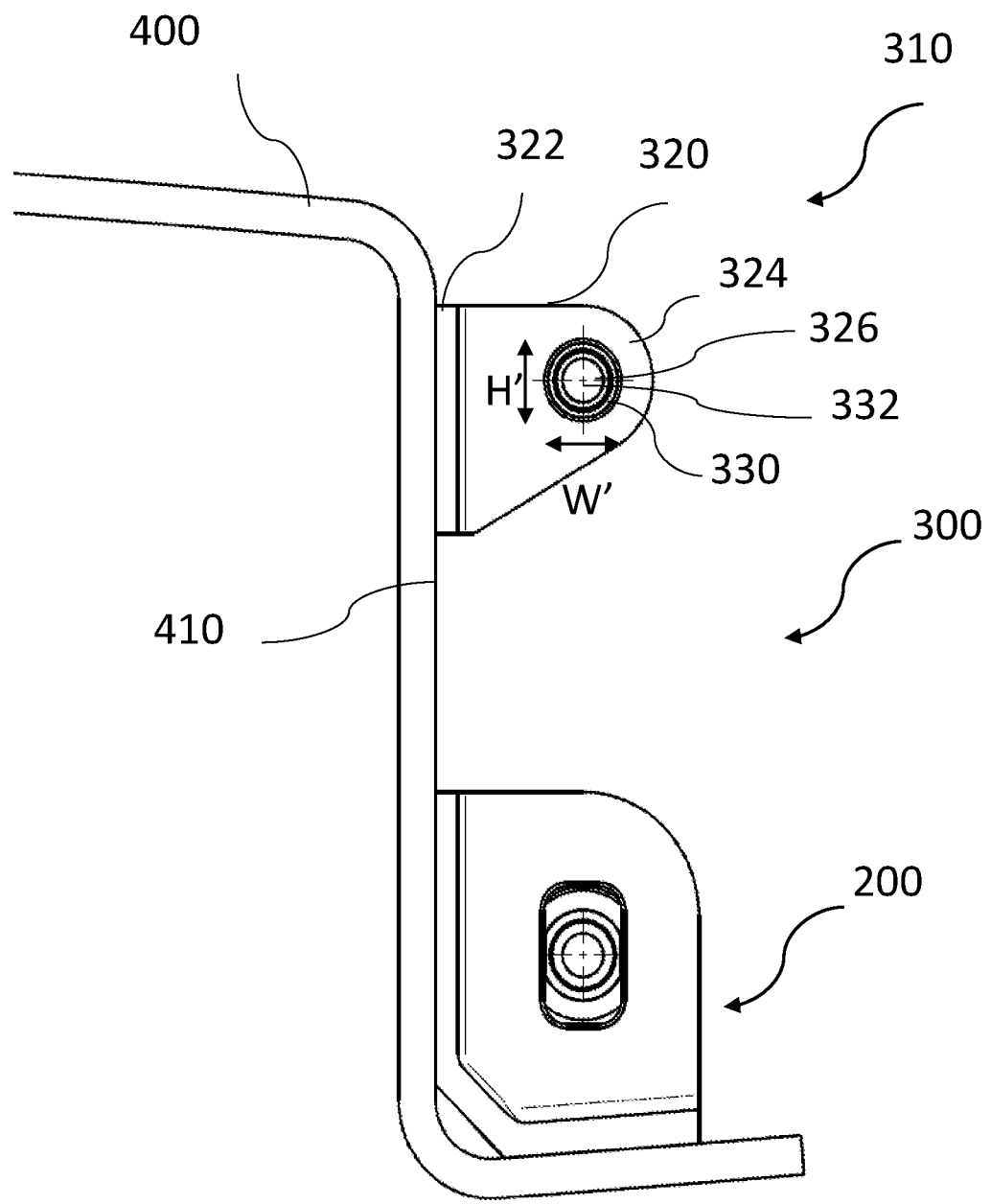
FIG. 4 shows a schematic side view of a fixed structure attachment arrangement according to an embodiment of the invention and a wing box spar.

FIG. 4 shows a schematic side view of a fixed structure attachment arrangement 300 and a wing box spar 400 having a datum surface 410. The arrangement 300 comprises a bracket assembly 310 and an adjustable fixed structure attachment system according to an embodiment of the invention. For example, the arrangement 300 may comprise an adjustable fixed structure attachment system 200, 202, 204 as described herein with reference to FIGS. 1-3, respectively. In the embodiment shown in FIG. 4, the arrangement 300 comprises a system 200 according to an embodiment of the invention. In use, the bracket assembly 310 is configured to indirectly connect a first fixed structure connector of a leading or trailing edge fixed structure to the datum surface 410, and the adjustable fixed structure attachment system 200 is configured to indirectly connect a second fixed structure connector of the leading or trailing edge fixed structure to the wing box spar 400. In some embodiments, such as that shown in FIG. 4, the second fixed structure connector may be indirectly connected to the datum surface 410 by the adjustable fixed structure attachment system.

The bracket assembly 310 comprises a bracket 320 comprising a back wall 322 configured to be fixedly attached to the datum surface 410 of the wing box 400, and a protruding wall 324 extending from the back wall 322. In this embodiment, the protruding wall 324 extends perpendicularly from the back wall 322. The protruding wall 324 comprises a circular aperture 326. In some embodiments, the bracket 320 comprises two identical protruding walls 324 extending parallel to each other from the back wall 322. In such embodiments, the apertures 326 comprised in the protruding walls 324 are co-axial to each another.

The bracket assembly 310 comprises a bush 330 having a bore 332 extending therethrough for receipt of a pin. The bush 330 is insertable into the aperture 324 and has an outer diameter corresponding to the diameter of the aperture 326 so that, when the bush 330 is in the aperture 326, the bush 330 is rotatable relative to the bracket 320. An axis of the bore 332 is co-axial with an axis of the aperture 326 when the bush 330 is in the aperture 326.

In use, the bracket assembly 310 is configured to connect a first fixed structure connector of a leading or trailing edge fixed structure to the datum surface 410 and the adjustable fixed structure attachment system 200 is configured to connect a second fixed structure connector of the leading or trailing edge fixed structure rib to the wing box spar 400. In some embodiments, the adjustable fixed structure attachment system 200 is configured to indirectly connect the second fixed structure connector to the datum surface 410. The slot 216 of the bracket 210 helps to manage tolerance build-up in the distance between the first fixed structure connector and the second fixed structure connector by permitting movement of the bush 220 of the adjustable fixed structure attachment system 200 in the height-wise direction of the slot 216.

Figure 5:
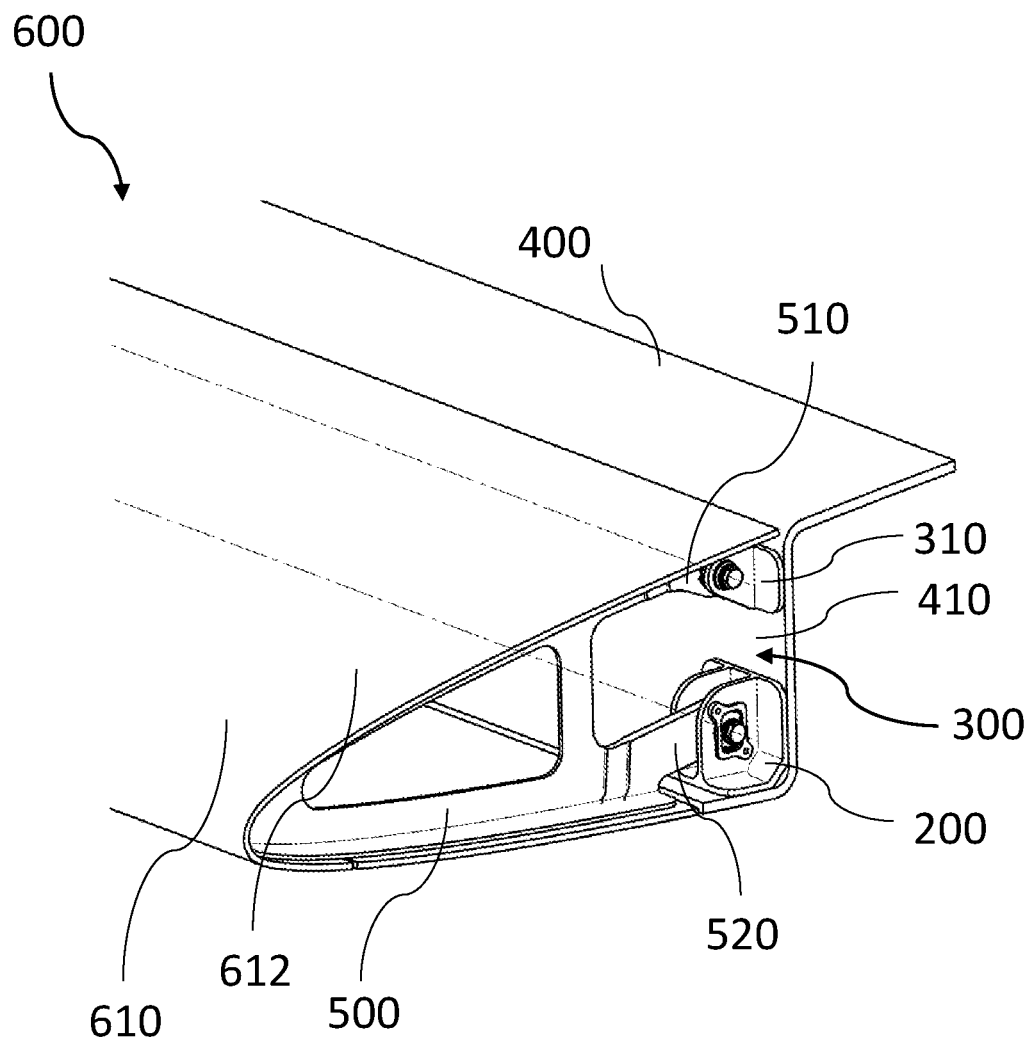
FIG. 5 shows a partial schematic isometric view of a modular aircraft wing portion.

FIG. 5 shows a partial schematic isometric view of a modular aircraft wing portion 600. The modular aircraft wing portion 600 comprises a wing box spar 400 defining a datum surface 410. In the embodiment shown in FIG. 5, the wing box spar 400 has a Z-shape. In other embodiments, the wing box spar 400 may have a different shape, for example a C-shape. The modular aircraft wing portion 600 comprises a leading or trailing edge fixed structure section 610 comprising a skin 612 and one or more fixed structure ribs 500. Each of the one or more fixed structure ribs 500 are for indirect connection to the datum surface 410 by a respective fixed structure attachment arrangement according to the invention. The modular aircraft wing portion 600 comprises one or more fixed structure attachment arrangements according to an embodiment of the invention. In this embodiment, the arrangement is an arrangement 300 as described with reference to FIG. 4, but comprises an adjustable fixed structure attachment system 204 as described with reference to FIG. 3, rather that the system 200 described with reference to FIG. 1. In embodiments comprising a plurality of fixed structure attachment arrangements, a first arrangement of the plurality of arrangements is configured to provide a connection between a first fixed structure rib 500 and the wing box spar 400. The connection is fixed in a spanwise direction of the wing portion 600. Each of the remaining arrangements of the plurality of arrangements is configured to provide a predetermined amount of adjustability, or float, between a respective fixed structure rib 500 and the wing box spar 400 in the spanwise direction.

The or each fixed structure rib 500 comprises a first fixed structure connector 510 for connection to the datum surface 410 by a respective one of the bracket assemblies 310 of the fixed structure attachment arrangement 300, and a second fixed structure connector 520 for connection to the wing box spar 400 by a respective one of the adjustable fixed structure attachment systems 204 of the fixed structure attachment arrangement 300. In other some embodiments, the fixed structure attachment arrangement 300 comprises a system 200 or 202 as described with reference to FIGS. 1-2, respectively.

In some embodiments, one or both of the first and second fixed structure connectors 510, 520 comprises a bearing (not shown), such as a spherical bearing, which can help to manage torsional tolerance build-up in the fixed structure 600.

FIG. 6 shows a schematic front view of an aircraft 700 according to an embodiment of the invention. The aircraft 700 comprises wings 710 and a fuselage 720. Each wing 710 comprises a wing box comprising a wing box spar (not shown). In some embodiments, the wing box spar is the wing box spar 400 as described with reference to FIG. 5. In some embodiments, the aircraft 700 comprises an adjustable fixed structure attachment system, for example the adjustable fixed structure attachment system 200, 202, 204 as described with reference to FIGS. 1-3, respectively. In some embodiments, the aircraft 700 comprises a fixed structure attachment arrangement, for example the fixed structure attachment arrangement 300 as described with reference to FIG. 4. In some embodiments, the aircraft 700 comprises a modular aircraft wing portion, for example the modular aircraft wing portion 600 as described with reference to FIG. 5.

It is to noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An adjustable fixed structure attachment system configured for an aircraft wing, wherein the adjustable fixed structure attachment system includes a bracket comprising:
a wall configured to connect to a wing box,
a first protrusion protruding from the wall, and
a first slot extending through the first protrusion, wherein the first slot has a height and a width; and
a first bush having a bore extending through the first bush and configured to receive a pin;
wherein the first bush is configured to be inserted into the first slot and dimensioned relative to the first slot so that the first bush is immovable in a width-wise direction of the first slot, and is moveable in a height-wise direction of the first slot to thereby vary a position of the first bush within the first slot.

2. The system according to claim 1, wherein an outer surface of the first bush comprises parallel flattened areas on opposing sides of the first bush, and
wherein a distance between the flattened areas is equal to the width of the first slot to prevent rotation of the first bush relative to the bracket when the first bush is in the first slot.

3. The system according to claim 1, wherein the first bush comprises a flange extending radially outwardly from an outer surface of the first bush, and
wherein the flange is configured to engage with the first protrusion, when the first bush is in the first slot, to prevent the first bush from passing through the first slot.

4. The system according to claim 3, comprising a retainer to hold the flange against the first protrusion, the retainer configured to permit movement of the first bush in the height-wise direction of the first slot.

5. The system according to claim 1, comprising a first sleeve configured to inspect into the bore of the first bush, the first sleeve having a hole extending therethrough for receipt of a pin.

6. The system according to claim 5, wherein, when the first sleeve is in the bore of the first bush, and the first sleeve is rotatable relative to the first bush.

7. The system according to claim 5, wherein an axis of the hole is non-co-axial with an axis of the first sleeve so that, when the first sleeve is in the bore of the first bush, and the first bush is in the first slot, rotation of the first sleeve relative to the first bush changes the distance between the wall of the bracket and the axis of the hole.

8. The system according to claim 1, comprising:
a pin configured to pass through the first slot of the first protrusion, the bore of the first bush, the hole of the sleeve, where present, and a fixed structure connection of a leading or trailing edge fixed structure, and
a pin retainer configured to engage with the pin to prevent movement of the pin along an axis of the pin when the pin is in the first slot, the bore, the hole, where present, and the connection point of the leading or trailing edge fixed structure and the pin retainer is engaged with the pin.

9. The system according to claim 1, wherein the bracket comprises:
a second protrusion protruding from the wall such that the first and second protrusions are parallel and a gap between the first and second protrusions is sufficient to receive a fixed structure connector of a leading or trailing edge fixed structure, and
a second slot extending through the second protrusion and positioned so that the first and second slots are co-axial, wherein the system comprises a second bush that is substantially identical to the first bush and is insertable into the second slot.

10. The system according to claim 5, comprising:
a second sleeve substantially identical to the first sleeve and the second sleeve is insertable into a bore of the second bush.

11. The system according to claim 8, wherein the pin is configured to pass through the second slot of the second protrusion, the bore of the second bush and the hole of the second sleeve.

12. A fixed structure attachment arrangement configured for an aircraft wing, wherein the fixed structure attachment arrangement includes a bracket assembly comprising:
a bracket comprising a back wall configured to be fixedly attached to a datum surface of a wing box spar, and a protruding wall extending from the back wall and comprising a circular aperture, and
a first bush having a first bore extending therethrough for receipt of a first pin, the first bush being insertable into the aperture and having an outer diameter corresponding to the diameter of the aperture so that, when the first bush is in the aperture, the first bush is rotatable relative to the bracket, and
an adjustable fixed structure attachment system including:
a wall configured to be fixedly attached to the wing box spar;
a protrusion protruding from the wall,
a slot extending through the protrusion, wherein the slot has a height and a width; and
a second bush having a second bore configured to receive a second pin;
wherein the second bush is dimensioned relative to the slot so that the second bush while in the slot is immovable in a width-wise direction of the slot and is moveable in a height-wise direction of the slot;
wherein, in use, the bracket assembly is configured to connect a first fixed structure connector of a leading or trailing edge fixed structure to the datum surface, and the adjustable fixed structure attachment system is configured to connect a second fixed structure connector of the leading or trailing edge fixed structure to the wing box.

13. The arrangement according to claim 12, wherein the bracket comprises:
a second protruding wall extending from the back wall such that the protruding walls are parallel and a gap between the protruding walls is sufficient to receive a first connection point of a leading or trailing edge fixed structure, the second wall comprising a second circular aperture having a diameter equal to the diameter of the circular aperture and positioned so that the circular apertures are co-axial, and a second bush that is substantially identical to the first bush and is insertable into the second aperture.

14. A modular aircraft wing portion including a wing box defining a datum surface;

a leading or trailing edge fixed structure for connection to the datum surface; and a fixed structure attachment arrangement according to claim 12, wherein the leading or trailing edge fixed structure comprises:

a first fixed structure connector for connection to the datum surface by the bracket assembly, and a second fixed structure connector for connection to the wing box by the adjustable fixed structure attachment system.

* * * * *